US005606462A

United States Patent [19]

Tsuruoka et al.

[11] Patent Number: 5,606,462
[45] Date of Patent: Feb. 25, 1997

[54] COLOR FILTER AND FLUORESCENT DISPLAY DEVICE HAVING COLOR FILTERS INCORPORATED THEREIN

[75] Inventors: Yoshihisa Tsuruoka; Haruhisa Hirakawa; Yoshinari Okamoto; Eiji Sato, all of Mobara, Japan

[73] Assignee: Futaba Denshi Kogyo K.K., Mobara, Japan

[21] Appl. No.: 273,757

[22] Filed: Jul. 12, 1994

[30] Foreign Application Priority Data

Jul. 12, 1993 [JP] Japan .................................... 5-171708
Jul. 12, 1993 [JP] Japan .................................... 5-171709

[51] Int. Cl.$^6$ ........................................ G02B 5/22
[52] U.S. Cl. .......................... 359/891; 359/885; 313/112
[58] Field of Search .................................. 359/885, 891; 252/586; 313/477 R, 479, 480, 461, 463, 474, 466, 465, 112; 430/511, 7

[56] References Cited

U.S. PATENT DOCUMENTS 4,670,188 6/1987 Iwasa et al. ............................ 252/513
4,757,231 7/1988 Kato et al. .............................. 313/466
5,305,154 4/1994 Sumi et al. ............................. 359/891
5,399,450 3/1995 Matsushima et al. ...................... 430/7

*Primary Examiner*—Paul M. Dzierzynski
*Assistant Examiner*—Darren E. Schuberg
*Attorney, Agent, or Firm*—Oblon, Spivak, McClelland, Maier & Neustadt, P.C.

[57] ABSTRACT

A color filter capable of being uniformly formed without any deformation of a light-permeable anode conductor and prevented from being adversely affected by etching for formation of the anode conductor. A light-permeable anode substrate free of any deformation is uniformly formed thereon with anode conductors, on which color filters are formed of a mixture of a composite oxide pigment and a conductive material so as to cover the anode conductors. The color filters each are formed by arranging a color filter material in a predetermined pattern, followed by calcination. Then, phosphor layers are deposited on the color filters. The phosphor layers are electrically connected through the conductive material of the color filters to the anode conductors. A thickness of the color filters and a particle diameter of the conductive material are determined to be substantially the same, so that the color filters exhibit conductivity only in a direction of thickness. Thus, contact between the color filters adjacent to each other does not cause electrical connection therebetween.

9 Claims, 3 Drawing Sheets

COLOR FILTER AND FLUORESCENT DISPLAY DEVICE HAVING COLOR FILTERS INCORPORATED THEREIN

BACKGROUND OF THE INVENTION

This invention relates to a color filter and a fluorescent display device having color filters incorporated therein.

There has been conventionally known a fluorescent display device which is adapted to carry out a full-color luminous display by means of color filters, which is generally constructed in such a manner as shown in each of FIGS. 5(*a*) and 5(*b*). More particularly, a conventional fluorescent display device generally designated at reference numeral 100 in each of FIGS. 5(*a*) and 5(*b*) includes an anode substrate 101 on which a display section is provided as described hereinafter.

The fluorescent display device 100 includes an airtight envelope, of which a part is constituted by the anode substrate 101 made of a light-permeable insulating material. The anode substrate 101 is provided on an inner surface thereof with three kinds of strip-like color filters 102, 103 and 104 of red, green and blue colors R, G and B in turn in a repeated manner and so as to be contiguous to each other without defining any gap therebetween. The color filters 102 to 104 each are provided thereon with a strip-like light-permeable anode conductor 105, as shown in FIG. 5(*a*). Alternatively, each of the color filters 102 to 104 may be provided thereon with a strip-like light-permeable anode conductor 105 formed with openings 108, as shown in FIG. 5(*b*). The anode conductors 105 each have a strip-like phosphor layer 106 deposited thereon. Thus, the strip-like phosphor layers 106 cooperate with the strip-like anode conductors 105 to form a plurality of strip-like anodes 107 arranged in parallel to each other so as to be spaced from each other at predetermined intervals. A phosphor material of the same kind is commonly used for the phosphor layers. For example, a ZnO : Zn phosphor material having a luminous spectrum of a wide range extending from a blue luminous color to a red luminous color with a green luminous color being interposed therebetween may be conveniently used for the phosphor layers.

The fluorescent display device also includes control electrodes and electron emitting cathodes (not shown) each constructed in a predetermined structure and arranged above the strip-like anodes 107 arranged in a strip-like manner, which cooperate with the anodes 107 to form a drive matrix. Matrix driving of the fluorescent display device 100 thus constructed permits a selected portion of the phosphor 106 of each of the anodes 107 to emit light of a green luminous color, which then passes through the color filters 102 to 104 and light-permeable anode substrate 101, to thereby be provided with colors of the color filters separately.

In formation of the color filters described above, a color filter material is prepared for every desired color by mixing a frit glass powder with a pigment exhibiting each of desired colors. Subsequently, the color filter materials for the respective desired colors are applied to the anode substrate 101 in turn and in a repeated manner by printing and then dried, followed by calcination in a lump.

As will be noted from the above, the color filters each are formed by subjecting a color filter material mainly consisting of inorganic materials to calcination, so that considerable roughness or unevenness is formed on a surface of each of the color filters. Thus, it is highly difficult to form the color filters into a flat configuration on the anode substrate.

Unfortunately, this causes formation of the anode conductors at pitches as fine as, for example, 1 mm on the color filters thus formed to be highly difficult and troublesome. Also, it causes formation of each of the anode conductors in a manner of permitting it to exhibit a uniform resistance to be extensively difficult. Use of an ITO film for the anode conductors causes them to be formed into an extensively reduced thickness, so that a resistance of each of the anode conductors is highly affected by or varied depending on unevenness on the surface of the color filters. Also, even use of an aluminum film for the anode conductors likewise causes a resistance of each of the anode conductors to be increased due to unevenness of the color filters, resulting in the anode conductors being often broken.

Alternatively, the anode conductors each may be formed by etching so as to be arranged in a stripe-like manner. However, a chemical agent or etching liquid used for the etching often leads to problems such as deterioration of the color filters, formation of further unevenness on the surface of the color filters, breaking of the anode conductors due to melting, and the like.

SUMMARY OF THE INVENTION

The present invention has been made in view of the foregoing disadvantage of the prior art.

Accordingly, it is an object of the present invention to provide a color filter which is capable of permitting a light-permeable anode conductor to be uniformly formed without any deformation.

It is another object of the present invention to provide a color filter which is capable of being kept from being adversely affected by etching carried out for formation of an anode conductor.

It is a further object to provide a fluorescent display device having color filters incorporated therein which are capable of accomplishing the above-described objects.

In accordance with one aspect of the present invention, a color filter is provided. The color filter is made of a color filter material comprising a mixture of an insulating inorganic pigment and a conductive material.

In a preferred embodiment, the conductive material comprises fine particles of a conductive substance.

In accordance with another aspect of the present invention, a color filter for a display device is provided. The color filter includes an anode conductor formed on an anode substrate of the display device and a color filter material comprising a mixture of an insulating inorganic pigment and fine conductive particles and deposited on the anode conductor.

In accordance with a further aspect of the present invention, a fluorescent display device is provided. The fluorescent display device includes an envelope, an insulating anode substrate constituting a part of the envelope, light-permeable anode conductors formed on an inner surface of the anode substrate, color filters made of a mixture of an insulating inorganic pigment and a conductive material and formed on at least an upper surface of each of the anode conductors, and phosphor layers each formed on an upper surface of each of the color filters.

In accordance with this aspect of the present invention, a fluorescent display device is provided. The fluorescent display device includes an envelope including a light-permeable anode substrate, light-permeable anode conductors arranged on an inner surface of the anode substrate and formed with openings, phosphor layers formed on the anode conductors, resulting in luminescence of the phosphor layers being observed through the openings of the anode conductors and the anode substrate, and filters arranged at at least the openings of the anode conductors.

As described above, in the present invention, the anode conductors are arranged directly on the anode substrate, resulting in being uniformly formed without any deformation. The color filters each are formed on each of the anode conductors subsequent to formation of the abode conductor, to thereby be kept from being adversely affected by an etching liquid used for formation of the anode conductor. The phosphor layer and anode conductor are electrically connected to each other through the color filter exhibiting conductivity.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a fluorescent display device of the present invention will be described hereinafter with reference to FIGS. 1 to 4.

Figure 1:
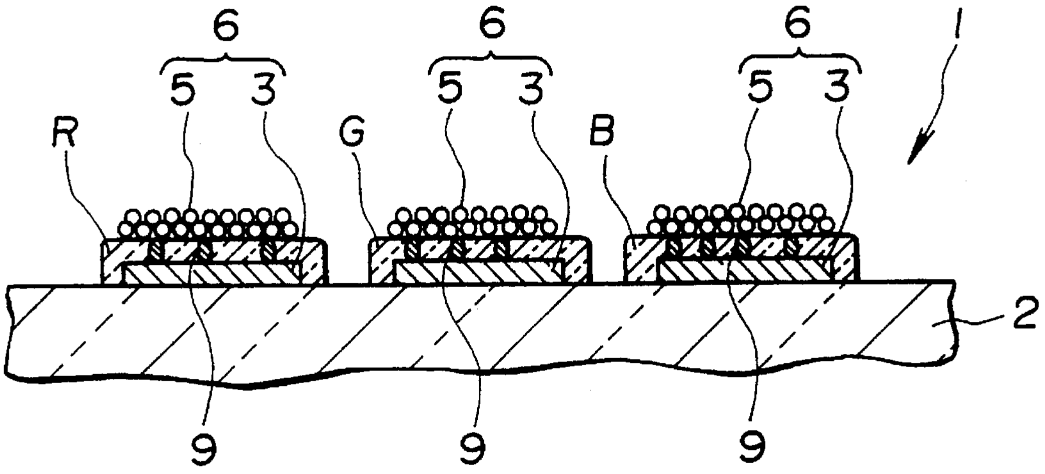
FIG. 1 is a fragmentary enlarged sectional view showing an essential part of an image display device which is a first embodiment of a fluorescent display device according to the present invention.

Referring first to FIG. 1, a first embodiment of a fluorescent display device according to the present invention is illustrated, which is constructed so as to carry out a full-color graphic display.

A fluorescent display device of the illustrated embodiment which is generally designated at reference numeral 1 in FIG. 1 includes a box-like envelope formed by sealedly integrally joining an anode substrate 2 made of an insulating light-permeable material and a cathode substrate (not shown) made of an insulating material to each other through insulating spacer members (not shown). The envelope thus formed is then evacuated to a high vacuum.

The anode substrate 2, as shown in FIG. 1, is formed on an inner surface thereof a plurality of strip-like light-permeable anode conductors 3 so as to be spaced from each other at predetermined intervals.

The anode conductors 3 are covered with color filters, respectively. In the illustrated embodiment, three kinds of color filters R, G and B of red, green and blue colors are provided in a predetermined order and in a repeated manner. The color filters R, G and B each are arranged so as to cover an upper surface of each of the anode conductors 3, as well as a side surface thereof and be contiguous to an upper surface of anode substrate 2. However, arrangement of the color filters is so carried out that the color filters adjacent to each other are kept from being contacted with each other.

The color filters R, G and B each are formed thereon with a strip-like phosphor layer 5. The strip-like phosphor layers 5 cooperate with the corresponding strip-like anode conductors to form a plurality of strip-like anodes 6 arranged in parallel to each other at predetermined intervals. A phosphor material of the same kind is commonly used for the phosphor layers 5. For example, a ZnO:Zn phosphor material having a luminous spectrum of a wide range extending from a blue luminous color to a red luminous color with a green luminous color being interposed therebetween may be conveniently used for the phosphor layers 5.

The fluorescent display device also includes control electrodes and electron emitting cathodes (not shown) each constructed in a predetermined structure and arranged above the strip-like anodes 6 arranged in a stripe-like manner, which cooperate with the anodes 6 to form a drive matrix.

The color filters R, G and B each are made of a color filter material comprising a mixture of an inorganic filter substance mainly consisting of a composite oxide pigment and a conductive substance 9 selected from the group consisting of $In_2O_3$, $SnO_2$, ZnO, ITO, Au, Ag, Cu, Ni, Al, W, Pt and the like and added in an amount of 0.01 to 30% by weight to the inorganic filter substance, resulting in being provided with conductivity.

The color filters R, G and B are formed into a film thickness of thousands Å and correspondingly the conductive substance 9 used has a particle diameter as fine as hundreds to thousands Å. Thus, each of the phosphor layers 5 and the anode conductor 3 corresponding thereto are permitted to be electrically connected to each other through the conductive substance 9 in each of the color filters R, G and B.

The color filters R, G and B preferably have anisotropic conductivity. More particularly, it is preferable that suitable adjustment of amount of the conductive substance 9 to be mixed with the inorganic filter substance permits each of the color filters R, G and B to be electrically conductive only in a direction of thickness of the color filter and keeps it from being conductive in a lateral direction thereof. Nevertheless, the illustrated embodiment does not necessarily require that the color filters are anisotropically conductive because the color filters adjacent to each other are kept from being contacted with each other.

When the fluorescent display device 1 of the illustrated embodiment constructed as described above is subject to a matrix driving to permit electrons to impinge on the phosphor layer 5 of each of the strip-like anodes 6 selected, an anode current is permitted to flow through the corresponding anode conductor 3, resulting in light of a green luminous color emitted from the phosphor layer 5 passing through each of the color filters R, G and B and the anode substrate 2, to thereby be provided with a color of each of the color filters, followed by observation.

Now, an essential part of manufacturing of the fluorescent display device 1 will be described hereinafter.

First, the strip-like anode conductors 3 are arranged in a stripe-like manner on the anode substrate 2. Then, the inorganic filter substance mainly consisting of a composite oxide pigment, the conductive substance 9 in a predetermined amount having a predetermined particle size and a vehicle acting as an adhesive substance are mixed together to prepare the color filter material like a paste for each of the color filters. The color filter material thus prepared is deposited in a strip-like shape on each of the anode conductors 3 on the anode substrate 2 by suitable techniques such as photolithography, printing or the like. Deposition of the color filter material is carried out for every color and then the color filter material deposited is dried for every color, followed by calcination in a lump for every color, leading to each of the color filters R, G and B. Then, a phosphor of the same kind is deposited on the color filters using suitable techniques such as printing, electro-deposition, photolithography or the like, leading to the anodes 6 arranged in a stripe-like manner.

In manufacturing of the fluorescent display device described above, the anode conductors 3 are provided directly on the anode substrate 2, resulting in being uniformly formed into predetermined fine dimensions without any deformation. Also, the color filters R, G and B depositedly formed on the anode conductors 3 are mainly made of the insulating inorganic material, however, they additionally contain, in a predetermined amount, the conductive substance of a particle diameter determined depending on a thickness of the color filters R, G and B, resulting in exhibiting conductivity at least in a direction of thickness thereof.

Also, the above-described manufacturing of the fluorescent display device prevents etching for formation of the anode conductors 3 from adversely affecting the color filters R, G and B because manufacturing of the color filters takes place after formation of the anode conductors.

Figure 2:
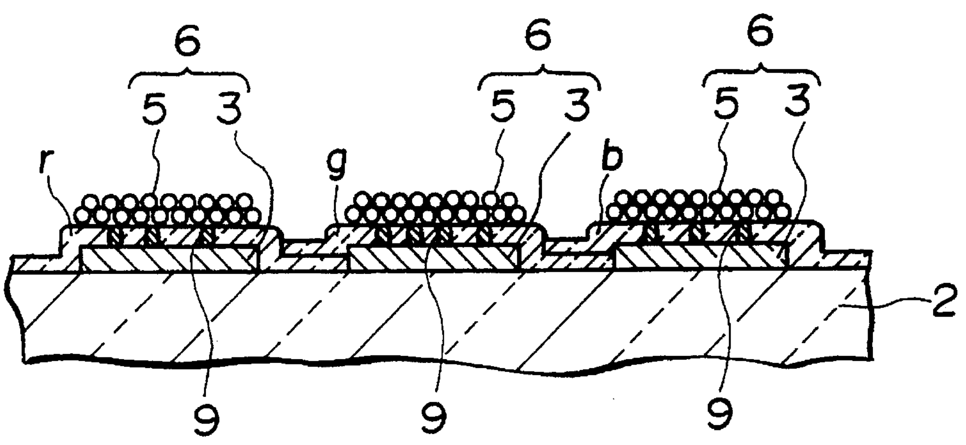
FIG. 2 is a fragmentary enlarged sectional view showing an essential part of an image display device which is a second embodiment of a fluorescent display device according to the present invention.

Referring now to FIG. 2, a second embodiment of a fluorescent display device according to the present invention is illustrated. The second embodiment may be basically constructed in substantially the same manner as the first embodiment described above. Parts of the second embodiment constructed in a manner like those of the first embodiment are designated by like reference numerals.

A fluorescent display device of the second embodiment is so constructed that color filters r, g and b adjacent to each other are vertically overlapped on each other on a portion or region of an anode substrate 2 defined between anode conductors 3 and 3 adjacent to each other.

In the illustrated embodiment, the color filters r, g and b each have such an anisotropic conductivity as described above, so that arrangement of the color filters in such an overlapped manner as described above does not lead to electrical connection between the color filters. Also, the region of the anode substrate 2 between each adjacent two of the anode conductors 3, as described above, is covered with two kinds of the color filters overlapped on each other, so that leakage of luminescence of a phosphor layer 5 which occurs through the region and anode substrate 2 is effectively prevented. More particularly, the color filters overlapped cause the region to be dark or function as a black mask which substantially prevents light from passing through the region. Further, it will be noted that the second embodiment exhibits in addition to the such advantages, substantially the same advantages as those of the first embodiments described above.

Figure 3:
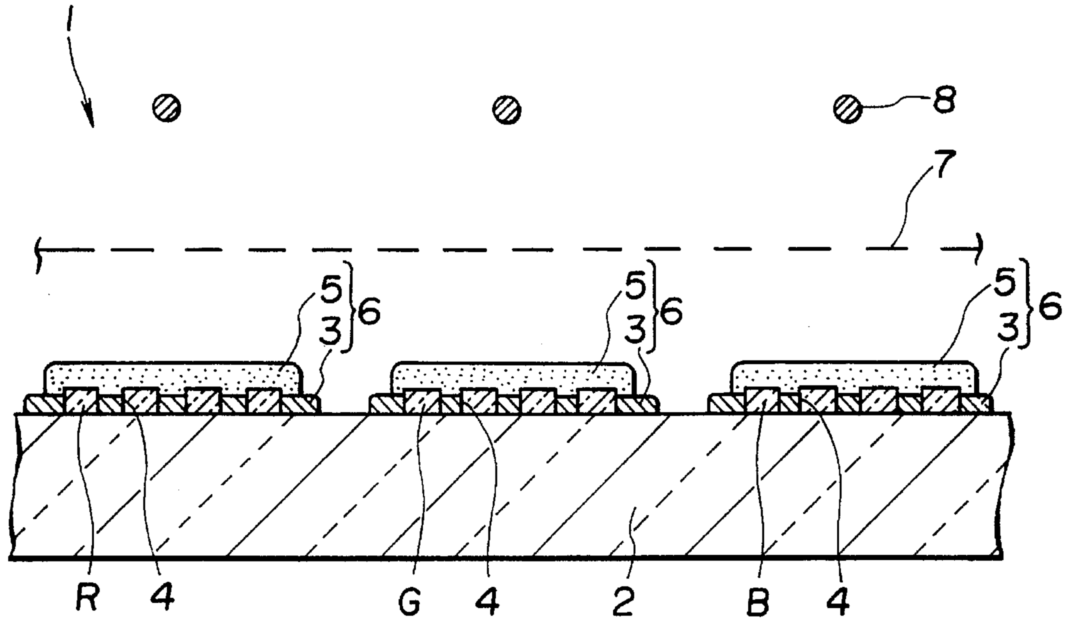
FIG. 3 is a fragmentary enlarged sectional view showing an essential part of an image display device which is a third embodiment of a fluorescent display device according to the present invention.

Referring now to FIG. 3, a third embodiment of a fluorescent display device according to the present invention is illustrated. A fluorescent display device of the illustrated embodiment, as shown in FIG. 3, is constructed in such a manner that an anode substrate 2 is provided on an inner surface thereof with a plurality of strip-like anode conductors 3, which are arranged in a stripe-like manner so as to be spaced from each other at predetermined intervals. The anode conductors 3 each are formed with a plurality of openings 4, to thereby be rendered light-permeable.

The anode conductors 3 are covered or filled at the openings 4 thereof with color filters R, G and B, respectively. In the illustrated embodiment, three kinds of color filters R, G and B of red, green and blue colors are filled in a predetermined order and in a repeated manner. The color filters R, G and B are arranged in the openings 4 of the anode conductors 3 rather than on an upper surface of the anode conductors 3.

The color filters R, G and B and anode conductors 3 each are provided thereon with a strip-like phosphor layer 5. Thus, the strip-like phosphor layers 5 cooperate with the corresponding strip-like anode conductors 5 to provide a plurality of strip-like anodes 6 arranged in parallel to each other at predetermined intervals. In each of the anodes 6 thus provided, the phosphor layer 5 is contacted directly with the anode conductor 3, resulting in being electrically connected thereto and concurrently covers each of the color filters R, G and B. A phosphor material of the same kind is commonly used for the phosphor layers 5. For example, a ZnO:Zn phosphor material having a luminous spectrum of a wide range extending from a blue luminous color to a red luminous color with a green luminous color being interposed therebetween may be conveniently used for the phosphor layers 5.

Above the anodes 6 arranged in a stripe-like configuration or manner are arranged control electrodes 7 and electron emitting filamentary cathodes 8 which are constructed into a predetermined structure. The control electrodes 7 and cathodes 8 cooperate with the anodes 6 to constitute a drive matrix.

When the fluorescent display device 1 of the illustrated embodiment constructed as described above is subject to matrix driving, electrons are permitted to be impinged on a portion of the phosphor layer 5 of each of the strip-like anodes 6 which is selected. This results in an anode current flowing through the corresponding anode conductor 3, to thereby cause the phosphor layer 5 to emit light of a green luminous color. The light thus emitted travels through the openings 4 of the anode conductors 3 on which the color filters R, G and B are arranged, to thereby be provided with colors of the filters separately. The colored light is then observed through the light-permeable anode substrate.

Now, an essential part of manufacturing of the fluorescent display device of the illustrated embodiment will be described hereinafter.

First, the anode conductors 3 provided with the openings 4 are arranged in a stripe-like manner on the anode substrate 2. The anode conductors 3 each are formed of an aluminum film on the anode substrate 2 and then provided thereon with a mask with high accuracy by photolithography, followed by etching.

Then, photolithography is carried out for formation of the color filters. First, a color filter material which comprises an inorganic pigment, photosensitive resin and a vehicle is prepared for every color filter. The color filter material is then printed on an upper surface of the anode conductors 3 so as to extend in a longitudinal thereof, to thereby be provided on the upper surface of the anode conductors, as well as in the openings 4. Printing of the color filter material is carried out in a lump for every color, followed by drying.

After printing and drying of the color filter materials for all colors are completed, light is externally irradiated through an outer surface of the anode substrate 2, so that all the color filter materials are exposed to light while using the anode conductors 3 provided with the openings 4 as a mask. Then, the color filter materials are subject to development, so that the color filters which were not subject to light exposure are removed, resulting in the color filters R, G and B being formed only in the openings 4. Thereafter, a phosphor of the same type is deposited on the anode conductors 3 and the thus-formed color filters R, G and B by printing, electro-deposition, photolithography or the like, so that the anodes 6 may be obtained which are arranged in a stripe-like manner.

In manufacturing of the fluorescent display device, the anode conductors 3 are provided directly on the anode substrate 2 by photolithography, to thereby be uniformly formed into predetermined fine dimensions without any deformation. Also, formation of the color filters R, G and B is carried out subsequent to formation of the anode conductors 3, to thereby prevent chemicals used in etching for formation of the anode conductors from adversely affecting the color filters R, G and B.

Also, the color filters R, G and B each can be formed into a size substantially equal to or somewhat larger than each of the openings 4 of the anode conductors 3, to thereby prevent light of the phosphor layer 5 from leaking out through the openings 4.

Figure 4:
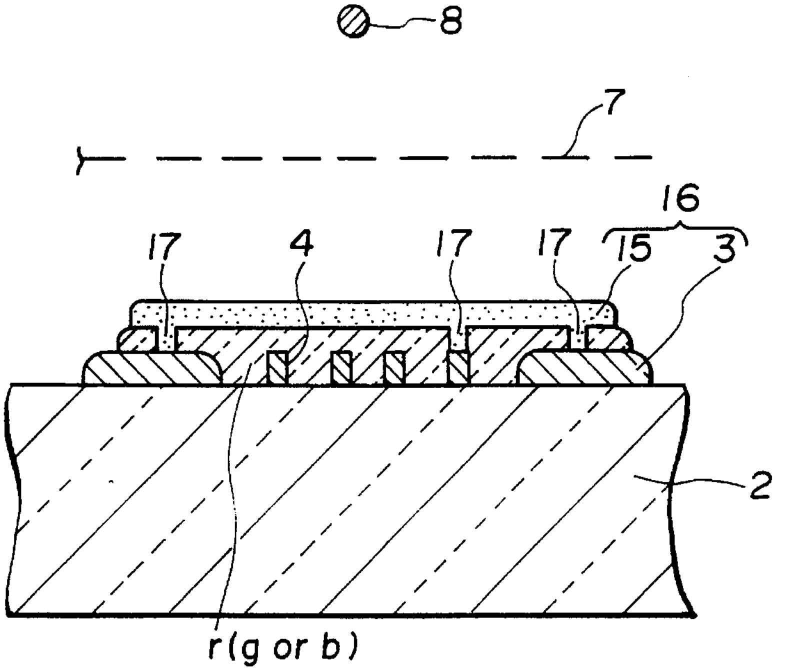
FIG. 4 is a fragmentary enlarged sectional view showing an essential part of an image display device which is a fourth embodiment of a fluorescent display device according to the present invention.
Figure 5A:
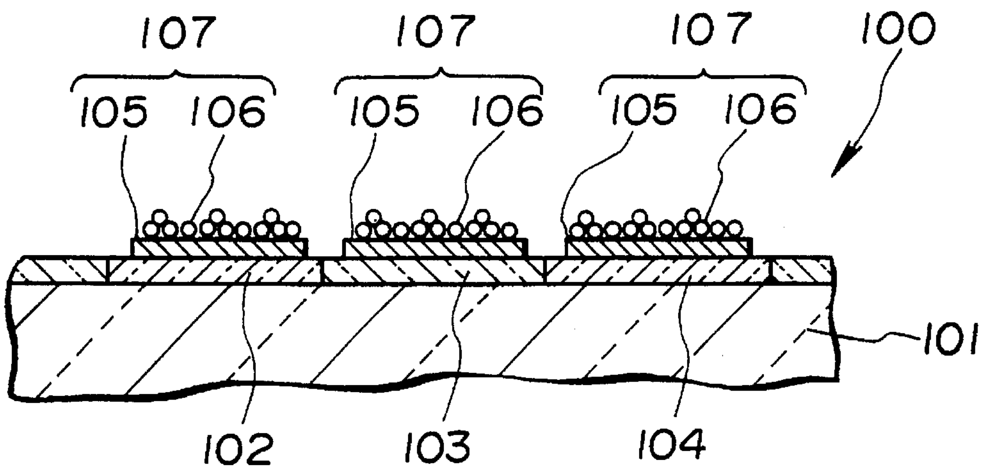
FIG.5(a) PRIOR ART
FIGS. 5(*a*) and 5(*b*) each are a fragmentary enlarged sectional view showing an essential part of a conventional fluorescent display device.
Figure 5B:
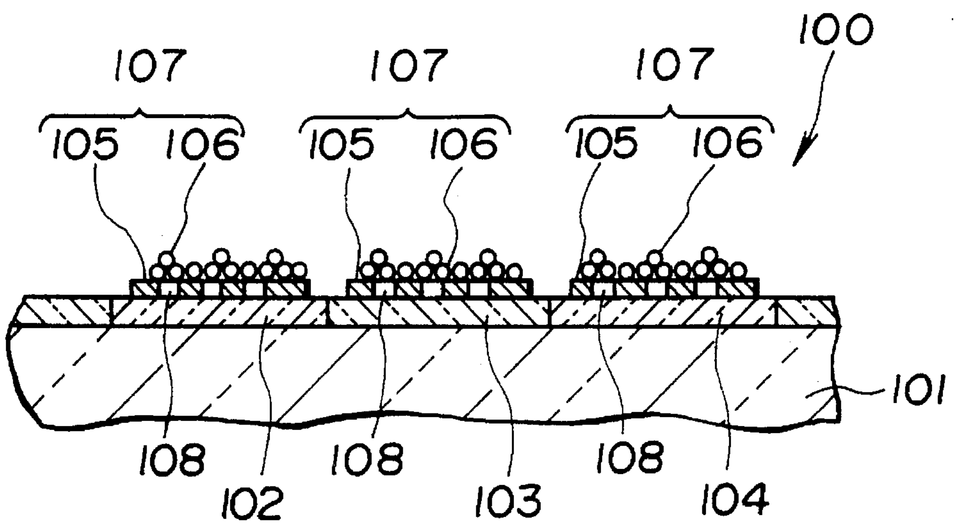
FIG.5(b) PRIOR ART

Referring now to FIG. 4, a fourth embodiment of a fluorescent display device according to the present invention is illustrated. A fluorescent display device of the fourth embodiment is basically constructed in substantially the same manner as the third embodiment described above. Parts of the fourth embodiment constructed in a manner like those of the third embodiment are designated by like reference numerals.

An anode substrate 2 is formed thereon with anode conductors 3 provided with openings 4. The anode conductors 3 are provided thereon with insulating color filters r, g and b, respectively. Then, the color filters r, g and b are formed thereon with phosphor layers 15, respectively. The color filters r, g and b each are formed at predetermined portions thereof with through-holes 17, through which the phosphor layer 15 is electrically connected to each of the anode conductor 3.

Now, formation of the color filters r, g and b constructed as described above will be described hereinafter.

First, a color filter material is printed all over each of the anode conductors 3 for every color. Then, a mask is positioned above the color filter material, to thereby cause the color filter material to be exposed to light through the mask. Thereafter, the color filter material is subject to development, resulting in each of the color filters r, g and b provided with the through-holes 17 being formed on each of the anode conductors 10. Then, the color filters r, g and b each are formed thereon with a phosphor layer 15, which is electrically connected via the through-holes 17 to the anode conductor 3 corresponding thereto, leading to formation of an anode 16.

The embodiments have been described in connection with a fluorescent display device. However, the color filter of the present invention may be effectively applied to any display device so long as it is a color display device of the type that luminescence is observed through an anode substrate and anode conductors. Also, the description has been made on the single phosphor material ZnO : Zn. Alternatively, a plurality of phosphor materials which are different in luminous colors may be used in correspondence to the color filters R, G and B, respectively, to thereby further improve purity of the colors.

As can be seen from the foregoing, the color filter of the present invention has the conductive substance incorporated therein. Thus, the anode conductors are provided directly on the anode substrate and then the color filters are deposited on the anode conductors, so that the color filters may be provided with electrical conductivity. Thus, the color filter of the present invention can be applied to any display device which requires a color filter and an anode conductor.

In the prior art, a color filter is subject to calcination at a temperature between 400° C. and 600° C. in an air atmosphere during manufacturing of the color filter, so that an anode substrate is apt to be thermally deformed. On the contrary, in the present invention, formation of the anode conductors on the anode substrate is carried out before formation of the color filter while keeping the anode substrate from any deformation, so that a fine wiring pattern may be realized.

Further, in the present invention, formation of the color filter is carried out after formation of the anode conductor, to thereby effectively prevent an etching liquid used for formation of the anode conductor from adversely affecting or deteriorating the color filter.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A color filter made of a filter substance comprising a mixture of an insulating inorganic pigment and a conductive material, said conductive material being contained in said filter substance in a predetermined amount based upon a thickness of said color filter so as to exhibit anisotropic conductivity, wherein electrical conductivity is substantially only in a direction of the thickness of said color filter.

2. A color filter as set forth in claim 1, wherein said conductive material comprises fine particles of a conductive substance.

3. A color filter as set forth in claim 2, wherein said conductive material is chosen from the group consisting of $In_2O_3$, $SnO_2$, ZnO, ITO, Au, Ag, Cu, Ni, Al, W and Pt.

4. A color filter as set forth in claim 3, wherein said fine particles have diameters on the order of one hundred angstroms to one thousand angstroms.

5. A color filter as set forth in claim 4, wherein the color filter has a thickness on the order of one thousand angstroms.

6. A color filter as set forth in claim 2, wherein said fine particles have diameters on the order of one hundred angstroms to one thousand angstroms.

7. A color filter as set forth in claim 6, wherein the color filter has a thickness on the order of one thousand angstroms.

8. A color filter as set forth in claim 1, wherein said conductive material is chosen from the group consisting of $In_2O_3$, $SnO_2$, ZnO, ITO, Au, Ag, Cu, Ni, Al, W and Pt.

9. A color filter as set forth in claim 8, wherein the amount of said conductive material has a weight from 0.01 to 30 percent of the weight of said organic filter substance.

* * * * *